W. C. SELLERS.
VEHICLE WHEEL.
APPLICATION FILED JULY 12, 1911.
1,033,739.
Patented July 23, 1912.
2 SHEETS—SHEET 1.
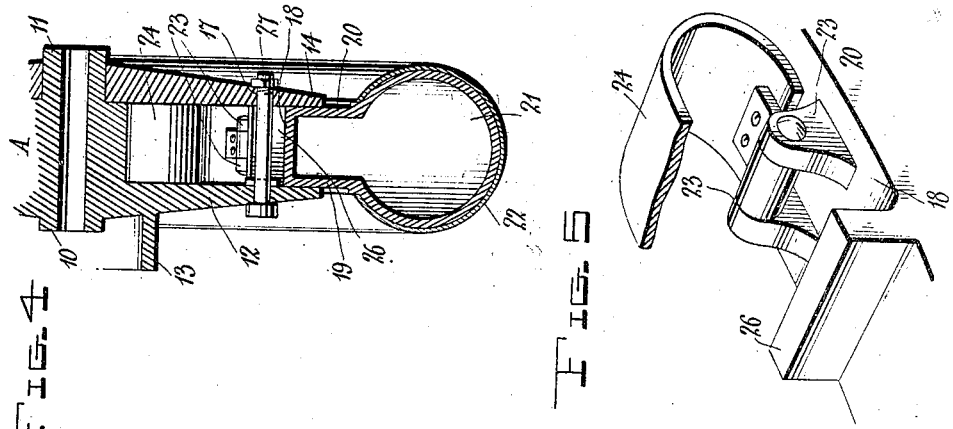
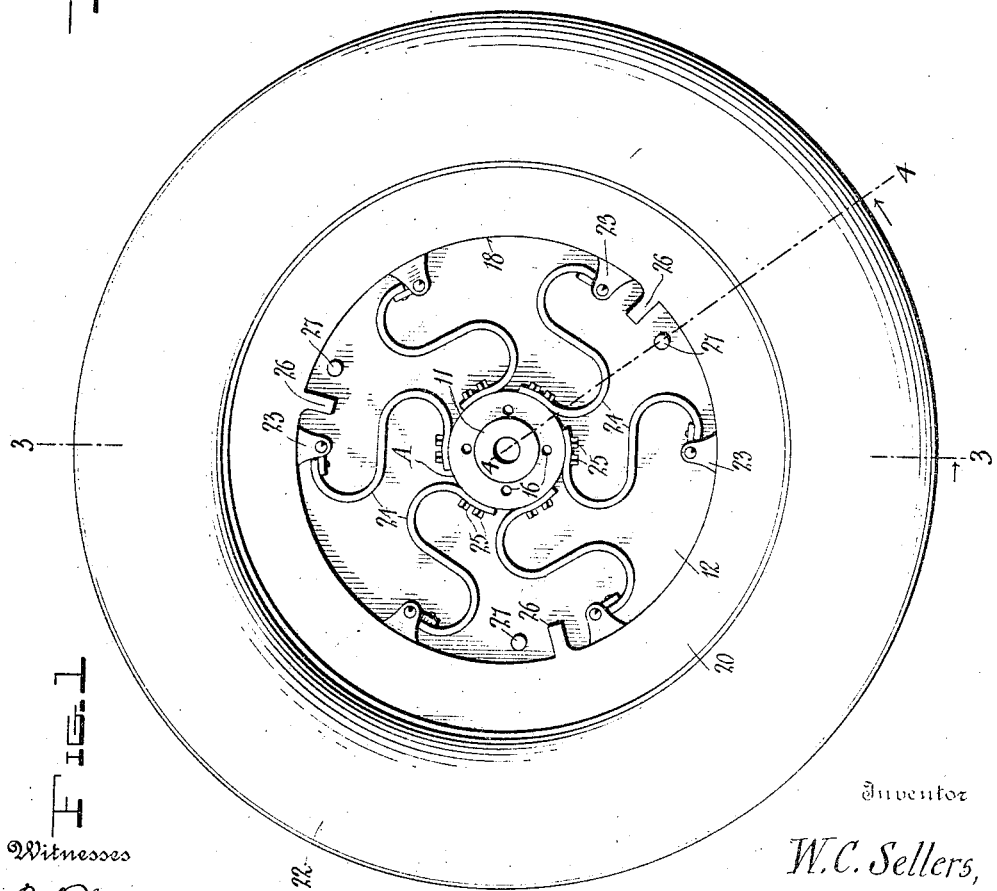
Witnesses
Inventor
W. C. Sellers,
By
Attorneys W. C. SELLERS.
VEHICLE WHEEL.
APPLICATION FILED JULY 12, 1911.
1,033,739.
Patented July 23, 1912.
2 SHEETS—SHEET 2.
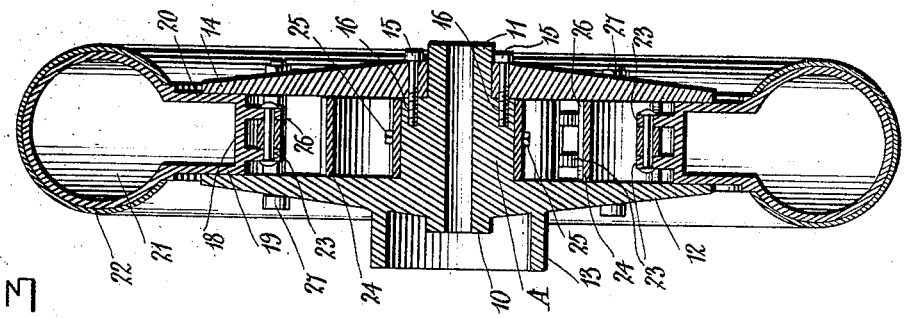
Fig. 3.
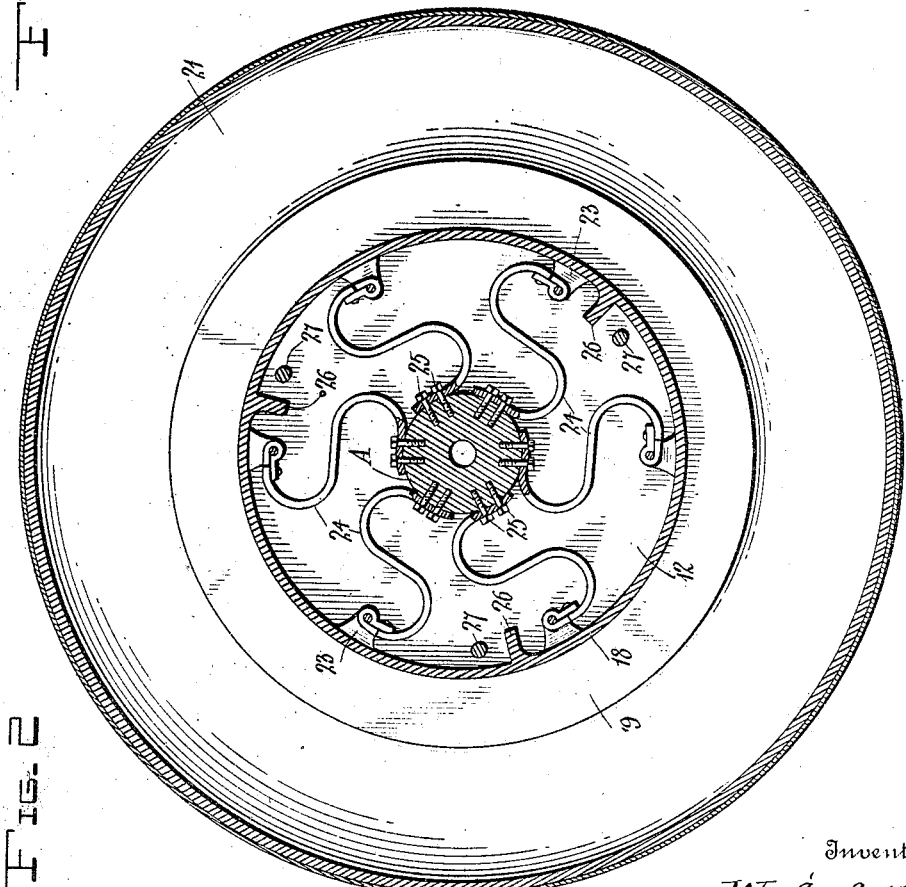
Fig. 2.
Witnesses
Inventor
W. C. Sellers
By 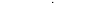
Attorneys

UNITED STATES PATENT OFFICE.

WILLIAM C. SELLERS, OF CARLSBAD, NEW MEXICO.

VEHICLE-WHEEL.

1,033,739.

Specification of Letters Patent.  Patented July 23, 1912.

Application filed July 12, 1911. Serial No. 638,196.

*To all whom it may concern:*

Be it known that I, WILLIAM C. SELLERS, a citizen of the United States, residing at Carlsbad, in the county of Eddy, State of New Mexico, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels and particularly those of the resilient type.

The object of the invention resides in the provision of a wheel of the character named in which the tire or tread portion of the wheel is yieldingly supported upon the hub in a manner that will effectually absorb undue shock incident to travel of the wheel over rough roads, whereby the comfort of occupants of the vehicle with which the wheel is associated is greatly enhanced.

A further object of the invention resides in the provision of a vehicle wheel which not only possesses the desired resiliency, but also ample strength to resist extraordinary strain imparted to the wheel as a result of skidding.

With the above and other objects in view, the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a side elevation of a wheel constructed in accordance with the invention, with the detachable side plate removed, Fig. 2, a sectional elevation of the wheel, Fig. 3, a section on the line 3—3 of Fig. 1 with the detachable side plate in place. Fig. 4, a section on the line 4—4 of Fig. 1, and Fig. 5, a detail perspective view of the connection between the yielding springs and the rim or tire of the wheel.

Referring to the drawings, the wheel is shown as comprising a hub A having reduced terminals 11 and 10 at its outer and inner ends respectively. Formed integral with the hub A at the inner end of the reduced terminal 10 is a circumferentially disposed flange 12 and formed integral with this flange 12 is a laterally directed flange 13 which constitutes the brake hub of the wheel. Removably mounted upon the reduced outer terminal 11 of the hub A in parallel spaced relation to the flange 12 is a side plate 14, the connection between said plate and hub being in the nature of bolts 15 which screw into suitable threaded recesses 16 formed in the hub. The side plate 14 is provided with a plurality of circumferentially disposed openings 17 for a purpose that will presently appear. Surrounding the intermediate portion of the hub A and disposed between the flange 12 and the side plate 14 is an annular rim 18. This rim 18 is provided at its outer edges with outwardly directed flanges 19 and 20 respectively and these flanges terminate at their outer ends in a cylindrical member 21 which constitutes the tread or tire of the wheel and is adapted to be provided with a suitable covering of heavy leather 22. The rim 18 is provided on its inner face at different points with spaced ears 23. Disposed between the rim 18 and hub A is a plurality of S-shaped springs 24 the upper ends of which are pivotally mounted between respective pairs of spaced ears 23 while their lower ends are fixed at spaced points respectively upon the intermediate portion of the hub A by means of screws 25. Also formed integral with the rim 18 and projecting from the inner face thereof is a plurality of driving lugs 26 which are adapted to be engaged under certain conditions by driving pins 27, which latter are arranged circumferentially of and fixed to the flange 12, the outer end of said driving pin extending through respective openings 17 in the side plate 14. By this construction it will be apparent that the rim 18 and the tread portion 21 of the wheel are yieldingly supported upon the hub so that undue vibration will be effectually absorbed before same has an opportunity to be transmitted to the occupants of the vehicle with which the wheel is associated. During the normal operation of the wheel the springs 24 constitute the connecting means for effecting the simultaneous rotation of the hub A and the rim 18. However, should one of these springs 24 become broken there would be a tendency to throw an additional strain on the remaining springs to effect the simultaneous rotation of hub and rim. In such a case however, the additional strain that can be transmitted to the remaining springs to effect the simultaneous rotation of hub and rim is limited by the engagement between respective driving pins 27 and driving lugs 26, such engagement effecting a positive drive of the rim independent of the springs 24. It will be further noted that the construction of the flange 12, side plate 14 and the rim 18 between the flange and side plate produces an exceedingly strong arrangement of parts, such as will be capable of resisting effectually any excessive strains due to skidding.

What is claimed is:

In a wheel, the combination of a hub having one end reduced and forming a resultant shoulder, an integral radially disposed flange on the other end of said hub, a side plate removably mounted on the reduced end of the hub and disposed against said shoulder in spaced relation to the flange, a rim surrounding said hub, said rim comprising an annular portion disposed between the side plate and flange, outwardly directed parallel flanges at the sides of said annular portion respectively and bearing respectively against said side plate and said hub flange whereby said annular portion and its flanges are adapted for movement radially of the hub, a connecting cylindrical tread portion between the outer ends of the flanges of said annular portion, and spring means disposed between the hub and annular portion of the rim for yieldingly holding the rim concentric with the hub.

In testimony whereof, I affix my signature, in presence of two witnesses.

WILLIAM C. SELLERS.

Witnesses:
HARRY I. BRADEN,
GLENN T. BURNETT.